(No Model.)　　　　　　　　　　　　　　　　　3 Sheets—Sheet 1.
J. STEPHENSON.
ELECTRIC CAR MOTOR JACKET.

No. 454,888.　　　　　　　　　　　Patented June 30, 1891.

WITNESSES　　　　　　　　　　　　　　INVENTOR
　　　　　　　　　　　　　　　　　　　　John Stephenson
　　　　　　　　　　　　　　　　　　By Foster & Freeman
　　　　　　　　　　　　　　　　　　　　　Attorneys.

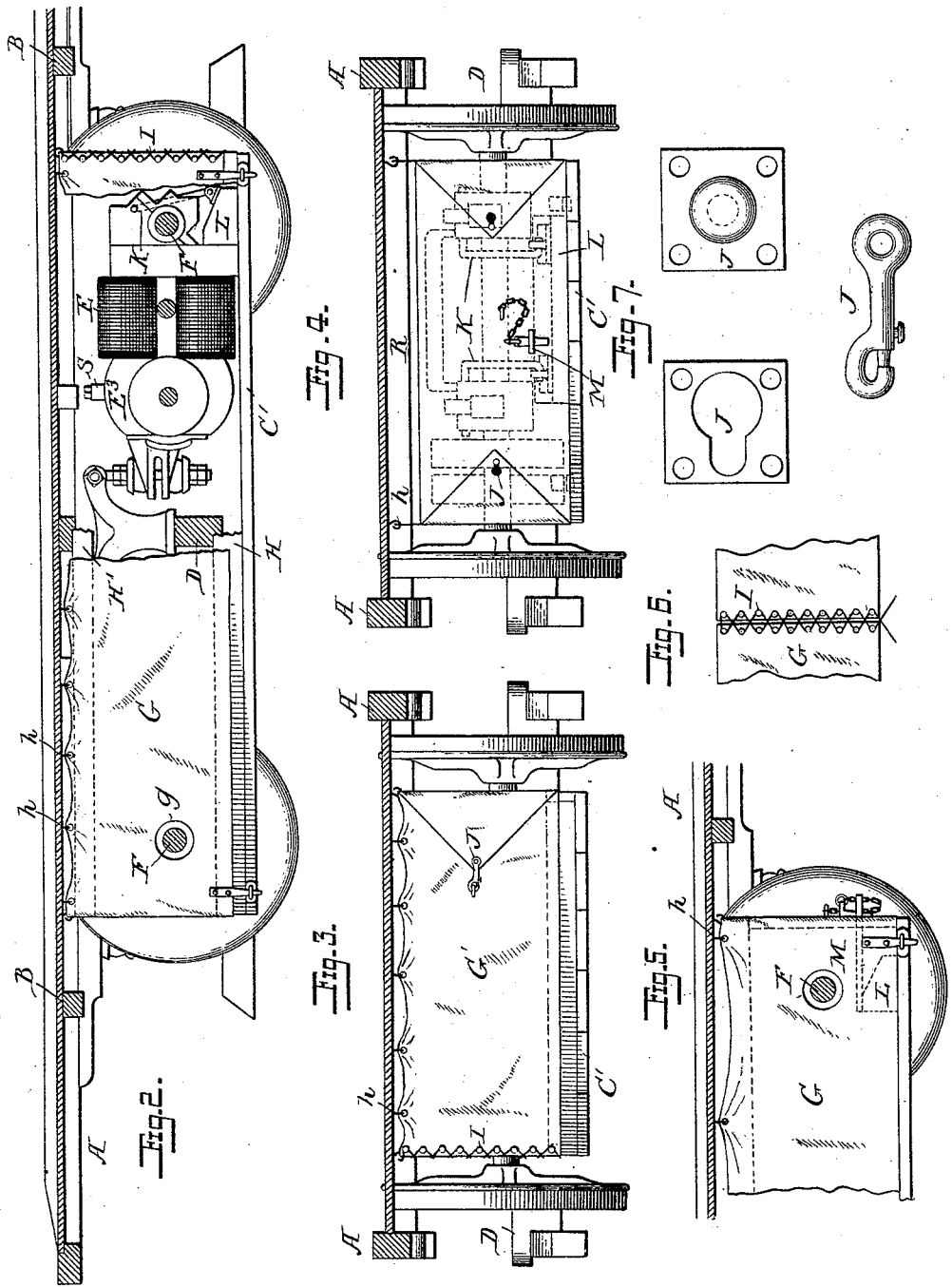

(No Model.) 3 Sheets—Sheet 3.

J. STEPHENSON.
ELECTRIC CAR MOTOR JACKET.

No. 454,888. Patented June 30, 1891.

WITNESSES

INVENTOR
John Stephenson
Foster Freeman
Attorney

United States Patent Office.

JOHN STEPHENSON, OF NEW YORK, N. Y.

ELECTRIC CAR-MOTOR JACKET.

SPECIFICATION forming part of Letters Patent No. 454,888, dated June 30, 1891.

Application filed December 12, 1890. Serial No. 374,436. (No model.)

*To all whom it may concern:*

Be it known that I, JOHN STEPHENSON, a citizen of the United States, residing at New York, in the county and State of New York, have invented certain new and useful Improvements in Electric Car-Motor Jackets, of which the following is a specification.

The mechanism of some parts of electric motors used in impelling tram-cars is of delicate construction and located in unfavorable circumstances—*i. e.*, under the car and near the ground exposed to mud and dust. There are difficulties in the way of protecting the machinery by boxing it up, because of the necessity for ready access to it to adjust or oil or repair in cramped or limited space, and also because the elevation of the car-floor varies with the ever-changing load of passengers. To meet these difficulties and necessities I make a jacket or housing of any suitable material (I find heavy cotton duck best adapted) to form vertical walls for the inclosure, the upper edges of the jacket or housing being attached to the floor of the car-body, and the lower edges being fastened to the floor or bottom of the housing, thus forming a box or case inclosing the electric motors.

In the accompanying drawings I have illustrated one manner of applying my invention, in which—

Figure 1:
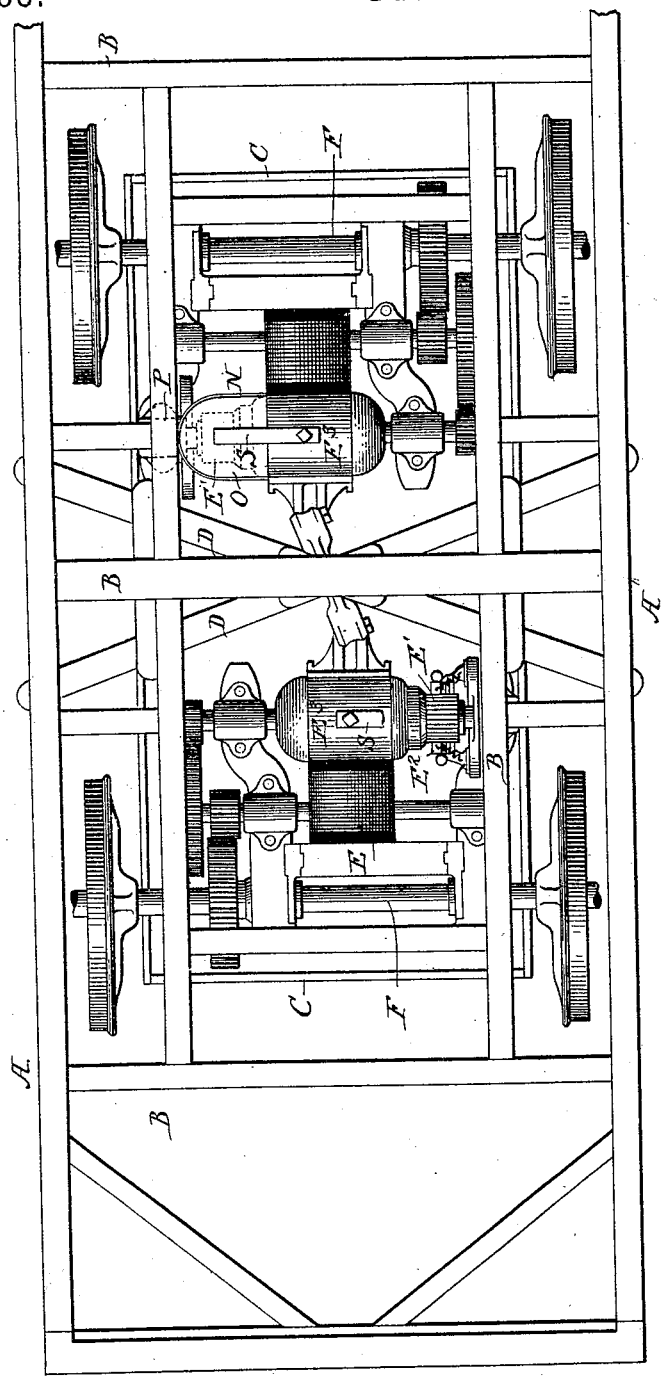
Figure 8:
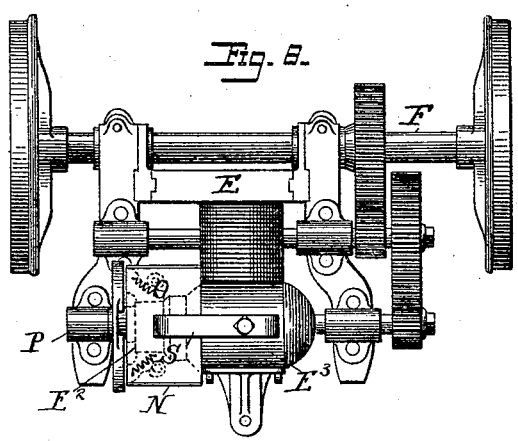
Figure 9:
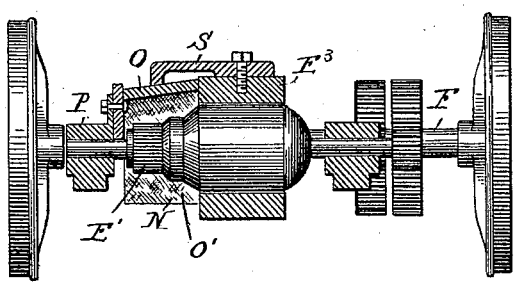
Figure 10:
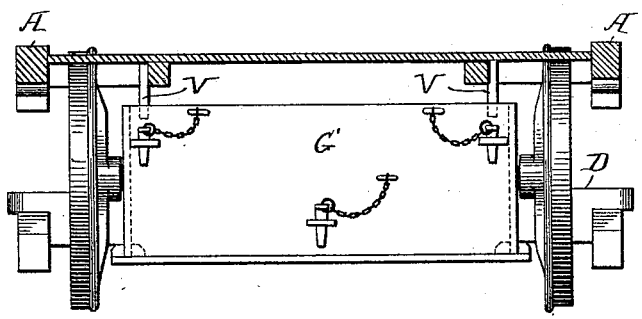

Figure 1 is a plan view showing the framework of the bottom of the car and the running-gear below. Fig. 2 is a longitudinal section of the same. Fig. 3 is a transverse section. Fig. 4 is a similar section of a modification showing a rigid end wall. Fig. 5 is a detail showing one means of fastening the sides to the cross-bottom. Fig. 6 is a detail showing the mode of fastening the corners of the motor-jacket, and Fig. 7 shows in detail some of the fastening devices, which I prefer to use. Fig. 8 is a plan view showing the motor with means for protecting the commutator and brushes. Fig. 9 is a vertical cross-section of the same; and Fig. 10 is an end view, partly in section, showing the protecting device.

In the drawings, A represents the side sills of the bottom frame-work, and B the floor-timbers.

C represents the motor jacket or case, while D represents the composite cross-timbers of the truck, from which the noses of the motors E are suspended, they being supported at their other ends at the axles F, it being understood that this arrangement of motors is shown as typical merely, as my invention can be applied to any arrangement of motor beneath the car.

The sides G and ends G' of the jacket are shown as made of some flexible material, preferably cotton duck, which permits the car-body to be depressed or elevated, as caused by the varying load of passengers. In some instances it may be desirable to have some of the box-sides made in sections because of cross-rails of the truck-frame or obstructions by some part of the machinery; or perforations $g$ may be made to allow the axles or other parts to pass through the flexible sides. The upper and lower edges of the fabric are re-enforced by rigid rails or verges H H', and each section is secured to its own rail, the upper edge or rail being adapted to hang to the car-floor and the lower rail being secured to the car-bottom or to the motors. I have shown the sides as supported from hooks $h$, attached to the floor of the car, and I find that two fastenings at the bottom are sufficient for each section of the vertical sides. The manner of fastening should be such as to facilitate connection and disconnection. Each corner or section may be united in any known method, though I prefer a vertical cord run through alternate eyelet-holes, as shown at I, or the end or side walls may be passed around the corner a sufficient distance and terminate in a snap-hook within a ring secured to the walls, as shown at J. The method of fastening is not material, except to attain security and expedition.

Should the vertical sides of the case or box be of rigid material, the vertical standing walls must be of a height limited by the movement of the car-floor when extremely depressed by the load, and the space above the wall may be closed by sections V of the wall pendent from the car-floor and sliding in a telescopic manner at either face of the standing walls, as shown in Fig. 10.

The body of the box is best upheld suspended to the motors, as by bolts or links K, and with retaining-blocks L, resting against the motors wherever available to secure the bottom from being displaced should it contact with some obstacle on the roadway.

It is sometimes regarded desirable to provide for a free circulation of air over and above the electric motors for cooling the electric mechanism. Therefore the end walls, as shown in Fig. 4, for instance, may be of panel or other style of work with the lower edges hinged or fastened to the box-floor C', or made easily removable, but held in vertical position by a brace M at the inner side of the case, (see Fig. 5,) thus leaving an air-space R above the end walls.

The commutator E' and brushes E² of the electric motor are of delicate mechanism, needing specially good protection and unobstructed access for speedy adjustment. They are usually located toward the central part of the car-body under the trap-door of the car-floor. I find it advisable to have a special casing N for each commutator and its brushes, and I find that electric motors are usually so constructed as that a broad cap or roof O may be made over the commutator and its brushes with a protecting curtain O' surrounding them. This roof and its curtain may be attached to the motor or to the truck-frame or other advisable place by any mode of fastening, by which it can be quickly released—as, for instance, with the Thomson-Houston motor. The cover or roof O is located with its higher end against the vertical wall of the pole-piece E³ and the lower end against the journal-box P of the armature-shaft, where the said lower end finds resistance, and thus a pressure near the higher end of the cover tends to tighten the cover, and it may be forced down by a long spring-button S on top of the pole-piece, no other fastening being needed.

While I have thus described and illustrated the application of my invention to one style of motors and car, it will be understood that the details of construction and arrangement may be varied to suit the requirements of each particular case without departing from the principles of the invention.

What I claim is—

1. A car with its electric motor incased, wholly or partly, with flexible vertical walls, with their upper and lower verges of rigid material, and thereby secured to the covering and to the bottom of the case, substantially as described.

2. A car with its electric motor incased, wholly or partly, with flexible vertical walls, with their upper and lower edges terminating in rigid material, by which the walls are fastened to the cover and to the bottom of the case or box, substantially as described.

3. A car with its electric motor inclosed in a case with vertical sides (wholly or partly of rigid or flexible material) secured at their lower verges to the case-bottom suspended to the motors and secured from displacement by retaining-blocks fastened to the case-floor and contacting with the motors, substantially as described.

4. A car having the end wall of the motor-case of rigid material and the side walls flexible, substantially as described.

5. A car with the side walls of the motor-case of flexible material and its end walls rigid, with space above the end walls for circulation of air, substantially as described.

6. A car with the side walls of the motor-case of flexible material and its end walls rigid, with space above the end walls for entrance and circulation of air, the ends being removable, substantially as described.

7. An electric car with its motor having a brush covered by a roof, under which is a curtain wholly or partly surrounding the brush, substantially as described.

8. An electric car with its motor-brush covered by a roof under which is a brush-protecting curtain, substantially as described.

9. An electric car with its motor-brush covered by a roof and protecting-curtain kept from displacement by a button or other attachment to the motor-machine, substantially as described.

In testimony whereof I have signed my name to this specification in the presence of two subscribing witnesses.

JOHN STEPHENSON.

Witnesses:
S. A. STEPHENSON,
WM. J. WALKER.